July 6, 1971         T. J. MEMORY         3,591,669
PLASTIC UNIVERSAL BEARINGS AND METOHD OF MANUFACTURE THEREOF
Filed May 7, 1968
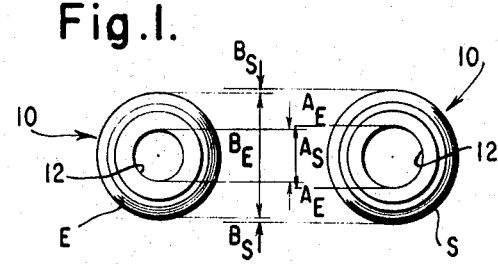
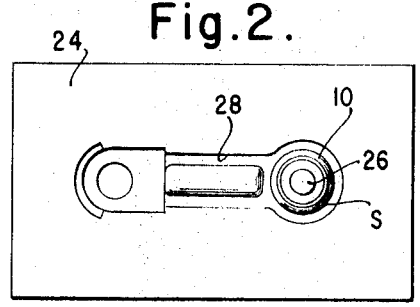
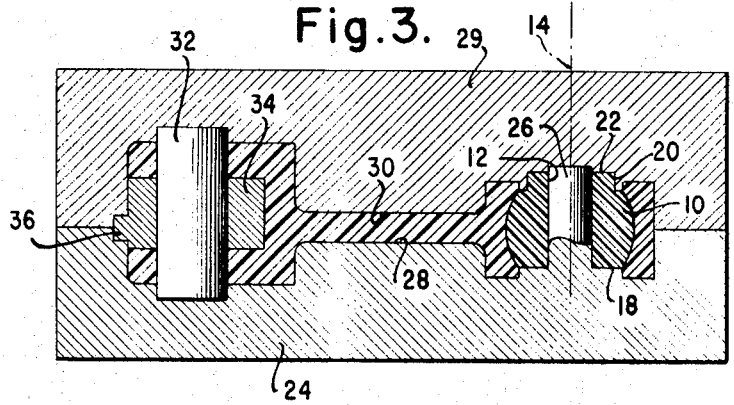
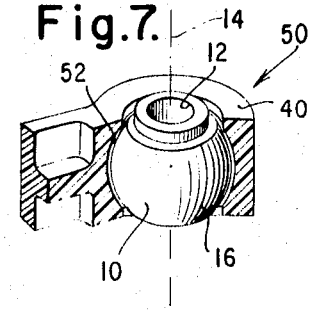
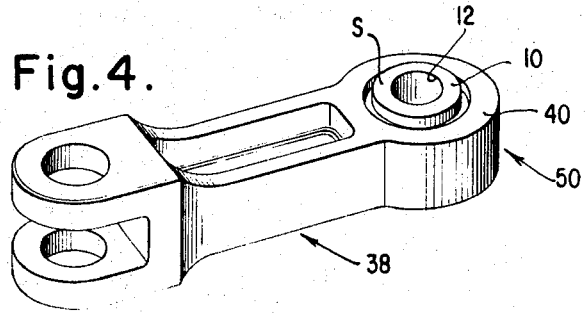
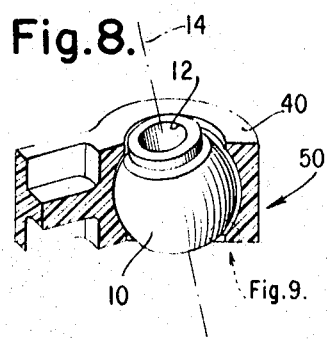
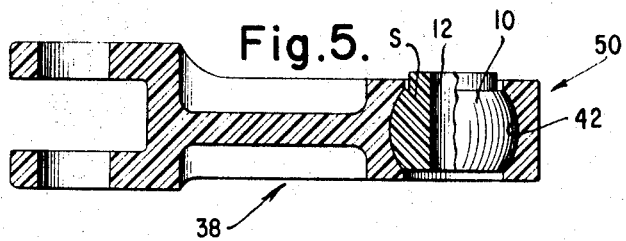
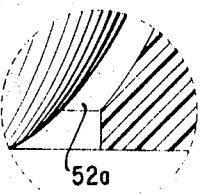
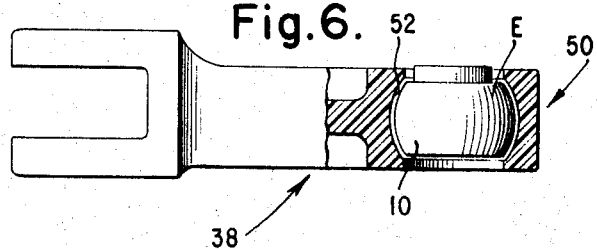
INVENTOR.
Thomas J. Membry
Witness
Rosalind Tsai
BY
Marshall J. Breen
ATTORNEY

United States Patent Office 3,591,669
Patented July 6, 1971

3,591,669
PLASTIC UNIVERSAL BEARINGS AND METHOD OF MANUFACTURE THEREOF
Thomas J. Membry, Parsippany, N.J., assignor to The Singer Company, New York, N.Y.
Filed May 7, 1968, Ser. No. 727,229
Int. Cl. B29b 3/00
U.S. Cl. 264—101                                         2 Claims

ABSTRACT OF THE DISCLOSURE

This disclosure relates to a plastic universal or self-aligning bearing of the ball and socket type and the method of manufacture thereof. The bearing is formed in a two-shot molding process in which a plastic bearing member is first molded and thereafter swelled by increasing the moisture content thereof. The swelled plastic bearing member is then inserted into a second die cavity in which a second material, plastic or metal, is molded into a suitable socket member which entraps the swelled insert therein. On subsequent treatment the moisture content of the insert is reduced, thus causing the insert to return to a smaller, or intial volume. This creates a clearance between said bearing member and said socket member which acts to lessen any frictional interference between said members on relative movement thereof.

BACKGROUND OF THE INVENTION

Heretofore, various methods have been used to obtain a clearance between a first and a second molded member such as by coating one of the members with a solid or liquid, or relying upon the differential shrinkage of the members having different co-efficient of expansion, or the like. In any event the prior art methods always resulted in complex procedures and costly apparatus so that even though it was possible to obtain a relative clearance between said members it was costly and only had limited application.

SUMMARY OF THE INVENTION

In accordance with the present invention the novel universal or self-aligning bearing is formed by molding a bearing element of a plastic material having reversible volumetric characteristics, so that said bearing element may be swelled prior to insertion into a second mold. Next a socket element is molded in said second mold and thereafter the entrapped bearing element is shrunk within the socket element to obtain a predetermined clearance therebetween to lessen the frictional interference caused by the relative movement of said elements.

It is possible to obtain a predictable clearance between the molded elements if the plastic element which undergoes the reversible volumetric change does so as a function of the liquid or moisture content thereof. For example, in the case of a bearing element made of type 6 nylon the general equilibrium moisture content is about 2.7% by weight. Depending upon the amount of clearance desired the bearing element would be swelled in any suitable manner, for example, by boiling in water or other liquid or in an autoclave under controlled temperature and pressure conditions, to increase the moisture content thereof within the range of from 4% to 11% by weight. The bearing element would then be interconnected to the socket element in the second mold. The bearing assembly is subsequently warmed in a vacuum oven to reduce the moisture content of the bearing element to the general equilibrium value of 2.7% by weight for ambient environmental operation. The change in volume of the bearing element can be controlled by the amount of the difference between the equilibrium and swelled values of the moisture content. Accordingly, to that extent, the size of the clearance can be predicted. Other factors can also effect the relative clearance and will be referred to hereinafter.

It is therefore an object of the present invention to provide an improved plastic universal bearing and a method for making the same using a two shot molding process which overcomes the prior art deficiency; which is simple, economical and reliable; which results in a bearing of the ball and socket type; which has interconnected elements adapted to be formed with a predetermined clearance therebetween; which has interconnected plastic elements adapted to be formed with a predetermined clearance therebetween; which has two elements one of which is made of plastic material having reversible volumetric characteristics capable of volume changes that will produce a predetermined clearance between said elements; which has a bearing element, entrapped in a socket element, susceptible of reversible volume changes by initially increasing its equilibrium moisture content prior to entrapment in the socket element and thereafter, restoring the moisture content to the equilibrium value; which has one of the elements thereof capable of reversible volumetric changes; which uses a bearing member made from plastic material capable of reversible volumetric changes upon the increase and decrease of the moisture content thereof; and which has one of the elements thereof capable of changing in volume at a predictable rate upon the addition of or substraction of liquid vapor or moisture therein.

Other objects and advantages will be apparent from the following description of one embodiment of the invention and the novel features will be particularly pointed out hereinafter in the claims.

BRIEF DESCRIPTION OF THE DRAWINGS

This invention is illustrated in the accompanying drawings in which:

FIG. 1 is a top plan view of a bearing member of a universal bearing made of plastic material having reversible volumetric characteristics in which the moisture content of the member shown on the left is substantially at equilibrium, and that of the member shown on the right in a swelled condition.

FIG. 2 is a top plan view of a portion of a second mold into which the bearing member has been inserted.

FIG. 3 is a sectional elevational view of the second mold in which the bearing socket element is being formed subsequent to the insertion of the bearing member.

FIG. 4 is a perspective view of the universal bearing upon its removal from the second mold.

FIG. 5 is a sectional elevational view of the universal bearing with the bearing member still in a swelled condition.

FIG. 6 is an elevational view, partly in section showing the bearing member subsequent to shrinking thereof.

FIG. 7 is a perspective view, partly in section, showing the longitudinal axis of the bearing member in a vertical position.

FIG. 8 is a perspective view, partly in section, showing the longitudinal axis of the bearing member inclined from the vertical position of FIG. 7.

FIG. 9 is a greatly enlarged portion represented by the dotted circle of FIG. 8 which shows the clearance between the bearing member and the socket member.

DESCRIPTION OF THE INVENTION

In the illustrated embodiment of the invention FIG. 1 shows a bearing member 10 that is molded of a plastic material having reversible volumetric characteristics and good bearing properties, one example of which would be type 6 nylon. The bearing member 10 illustrated on the left side of FIG. 1, has the moisture content thereof at equilibrium, as is indicated generally by the reference character E. The outer diameter of the E bearing member 10 is indicated as $B_E$, and the diameter of the cylindrical hole 12 extending therethrough is indicated as $A_E$. The moisture content of a bearing member 10 made from type 6 nylon at a state of equilibrium is about 2.7% by weight.

The moisture content of the bearing member 10 made of type 6 nylon may be swelled to from 4% to 11% by weight by introducing said member into an autoclave and exposing it to water vapor or water or other suitable liquid, under controlled conditions of temperature and pressure. Alternately said member could be placed in or over boiling water. For material such as type 6 nylon, where the reversible volume change is a function of the liquid content thereof, control of the increase in the moisture content will produce predictable swelling characteristics whereby the increase in size of the bearing member will be determined by the increase in the moisture content of said member. The bearing member 10 shown on the right side of FIG. 1 represents a member that has been swelled by increasing the moisture content thereof, as for example, for type 6 nylon the increase would be to raise the moisture content thereof from 4% to 11% by weight with the swollen state of said member indicated by the reference character S. The outer diameter of the S bearing member 10 is indicated as $B_S$ and the diameter of the hole 12 is indicated as $A_S$. FIG. 1 offers a comparison of the dimensions of the bearing member 10 at equilibrium and in a swollen state, and it is noted that the outer diameter increases upon the member being swollen, while the diameter of the hole 12 also increases, as would be expected.

The bearing member 10 may be a molded member having the central aperture or hole 12 formed along the longitudinal axis 14 thereof. The bearing member 10 has a spherical outer periphery 16 that extends from a flat bottom 18 to a stepped cylindrical neck portion 20 adjacent a flat top 22 thereof, as illustrated in FIG. 3.

The improved universal or self-aligning bearing of the present invention is made by a two-shot molding process, with the first step being to form the bearing member 10 in a mold (not shown). Thereafter the bearing member 10 is swelled and inserted into the bottom half of a second mold 24, and held in position by an integrally formed pin 26 thereof. A cavity 28 is formed in the upper surface of the bottom half of the mold member 24. An upper mold member 29 of the second mold 24, illustrated in FIG. 3 mates with the lower half of the mold member 24 and has a corresponding cavity 30 formed in the lower surface thereof so as to define a combined space therewith into which the material for the second mold is delivered, which space defines a shape corresponding to the mechanical link or socket element of the universal bearing. In order to form the bifurcated end of the second molded member a pin extends between the molds 24 and 29, and has a spacer 34 disposed thereabout which includes a U shaped lip 36 which seats in a recessed portion of the adjoining surfaces of the mold members.

The formation of the second molded member or mechanical link, designated generally as 38, serves to entrap the swollen plastic bearing member 10 in the socket end 40 thereof by the spherically shaped walls 42 that encircle said swollen insert in substantial abutment therewith, as shown in FIGS. 3, 4 and 5. Thereafter, the molded assembly or universal bearing 50 is warmed in a suitable vacuum oven (not shown) so as to reduce the moisture content of the bearing member 10 and restore it to the equilibrium level for the ambient environmental operation in question.

Though the bearing member 10 has returned to its initial equilibrium size E, it has shrunken relative to the mechanical link 38, as shown in FIG. 6, to create a predetermined clearance 52 between the spherical side 16 thereof and the socket wall 42 of the mechanical link 38 so as to lessen any frictional interference caused by relative movement of the link 38 or the bearing member 10.

FIGS. 7, 8 and 9 illustrate the self-aligning feature of the universal bearing 50. The spherical shape of the corresponding surfaces adjacent of the bearing member 10 and the socket portion 40 serve to entrap the socket element 10 therein without limiting the relative movement therebetween. FIG. 7 shows the bearing member 10 positioned with its axis disposed vertically. Assuming the member 10 were to move responsive to a connected element (not shown) so as to assume a position in which the axis 14 lies along a line inclined from the vertical, contact would be established between the surface 16 and the left side of the socket wall 42, as shown in FIG. 8. This would increase the clearance on the right side, or side opposite the contact, which clearance is designated generally as 52a and represents the maximum possible clearance between the link 38 and bearing member 10. The establishment of the clearances 52 and 52a within the manufacturer's tolerances permits the relative low frictional movement between the members 38 and 10 of the universal bearing 50, while enabling the axis 14 of the member 10 to, at all times, maintain its alignment with the element to which it is connected.

It is important to establish a predetermined clearance 52 between the member 10 and the socket portion 40 not only to provide for low frictional movement therebetween but also to prevent excessive clearance that would result in a undesirable amount of "play" that could result in either excessive wear or the build-up of forces that would ultimately cause a failure in one of the members or a connected component.

Accordingly, control of the increase in the moisture content of the bearing member 10, to change the same from the E state to the S state, prior to insertion of the bearing member 10 in the second mold 24 is one way to produce a predetermined increase in the size of the member 10 which when subsequently restored to equilibrium size results in a predictable clearance between the members 10 and 38 of the universal bearing 50. For any given bearing member 10 having known characteristics of reversibility, whether as a function of the moisture content or for other reasons that are either controllable or predictable, a universal bearing 50 may be produced with a clearance tailored for a particular use or system.

The plastic bearing member 10 may be made of any suitable bearing material having reversible volumetric characteristics, among which are certain types of nylon, fluorocarbon, phenolics acetals, or polyimides.

The mechanical link 38 may be made from a suitable plastic including a thermoplastic, or thermosetting plastic, among which are phenolic, polypropylene, acetal or polycarbonate resins, by any known process, as for instance, casting, injection transfer molding, compression molding or the like. In fact, the use of a high temperature plastic for the bearing member 10 would permit the mechanical link 38 to be made of a suitable metal formed on a low temperature die casting, such as one of the zinc alloys.

The reversibility of a given member 10 can be influenced in many ways, both in combination with the increase in volume and as a separate matter which must be considered in order to accurately predict the clearance in each instance. For example, in molding said member high stresses may occur which are released by the reversible act of water absorption or infusion and subsequent extraction serving to produce a member having decreased dimensions over one that had not been "pre-stressed." Other factors to be considered are the molding profile, mold design, stress relief in processing, relative shrinkage of the bearing members and hydrogen bonding due to exposure to water or other liquid. The molding profile relates to conditions of direction gating the mold, temperature, speed, pressures which will vary from material to material and therefore always must be taken into consideration.

Reference has been made herein to water being used as the liquid to produce the reversible volumetric change in the moisture content of the bearing member 10, but any liquid capable of causing a complete or partially reversible volume change for a given plastic of which the bearing member 10 is composed may be used for this purpose.

It will be understood that various changes in the details, materials arrangements of parts and operating conditions which have been herein described and illustrated in order to explain the nature of the invention may be made by those skilled in the art within the principles and scope of the invention as expressed in the claims.

Having thus set forth the nature of this invention, what I claim herein is:

1. A method of forming a universal bearing including a bearing element movable within a socket element at a variable predetermined clearance fit therebetween, said method comprising the steps of:
   (a) molding a plastic spherical bearing element having reversible variable volumetric characteristics, said bearing element being in equilibrium, which occurs in the range of from 0% to 4% moisture content to weight ratio,
   (b) placing the bearing element into an autoclave having a controllable temperature, pressure and moisture,
   (c) swelling selectively the bearing element to a percentage above the equilibrium, up to 7% moisture content to weight ratio by forcing, under pressure, moisture into the interstices of the bearing element to swell the bearing to a predetermined volume,
   (d) removing the swollen bearing element from the autoclave,
   (e) molding a socket element about the swollen bearing element,
   (f) evacuating the moisture content from the swollen bearing element, said bearing element returning to equilibrium and decreasing in volume, thereby causing a clearance between the bearing element and the socket element equal to the decrease in volume of the bearing element.

2. A method of forming a universal bearing element movable within a socket element with a predetermined clearance fit therebetween, said method comprising the steps of:
   (a) molding a plastic spherical bearing element having reversible volumetric characteristics, said bearing element being in equilibrium which occurs in the range of 0% to 4% moisture content to weight ratio,
   (b) placing the bearing element into an autoclave having a controllable temperature, pressure and moisture,
   (c) forcing under pressure, interstitially a predetermined amount of moisture into the bearing element above the equilibrium up to 7% moisture content to weight ratio to cause the bearing element to become swollen to a predetermined size,
   (d) removing the swollen bearing from the autoclave,
   (e) placing the swollen bearing element into a mold for making the socket element,
   (f) molding the socket element around the swollen bearing element,
   (g) removing the socket element and the bearing element now entrapped within the socket element from the socket element mold,
   (h) placing the bearing element entrapped within the socket element into a vacuum oven,
   (i) evacuating the interstitial moisture content of the bearing element to equilibrium thereby decreasing the volume of the bearing element causing a predetermined clearance between the entrapped bearing element and the socket element equal to the decrease in volume of the bearing element.

References Cited

UNITED STATES PATENTS

| | | | |
|---|---|---|---|
| 2,577,350 | 12/1951 | Morin | 18—55 |
| 3,363,300 | 1/1968 | Stec | 264—242 |
| 2,142,150 | 1/1939 | Repogle | 264—343 |
| 3,443,006 | 5/1969 | Simons | 264—249 |

ROBERT F. WHITE, Primary Examiner

R. H. SHEAR, Assistant Examiner

U.S. Cl. X.R.

264—242, 343